(No Model.) 2 Sheets—Sheet 1.

E. G. LATTA.
VEHICLE WHEEL.

No. 479,566. Patented July 26, 1892.

Witnesses:
Emil Neuhart
Fred. C. Guyer

Emmit G. Latta Inventor.
By Wilhelm Bonner
Attorneys.

(No Model.) 2 Sheets—Sheet 2.
E. G. LATTA.
VEHICLE WHEEL.

No. 479,566. Patented July 26, 1892.

Witnesses:
Emil Neuhart
Fred. C. Geyer

Emmit G. Latta Inventor
By Wilhelm Bonner
Attorneys.

UNITED STATES PATENT OFFICE.

EMMIT G. LATTA, OF FRIENDSHIP, NEW YORK.

VEHICLE-WHEEL.

SPECIFICATION forming part of Letters Patent No. 479,566, dated July 26, 1892.

Application filed January 16, 1892. Serial No. 418,263. (No model.)

*To all whom it may concern:*

Be it known that I, EMMIT G. LATTA, a citizen of the United States, residing at Friendship, in the county of Allegany and State of New York, have invented new and useful Improvements in Vehicle-Wheels, of which the following is a specification.

My invention relates to pneumatic tires for velocipedes and other vehicles, and has for its principal object to provide a tire of this class which is easily applied to the rim of the wheel and which can be readily removed for making repairs and be as easily replaced.

My invention has the further object to provide the tire with simple and efficient means for preventing it from creeping or becoming displaced on the rim.

Figure 1:
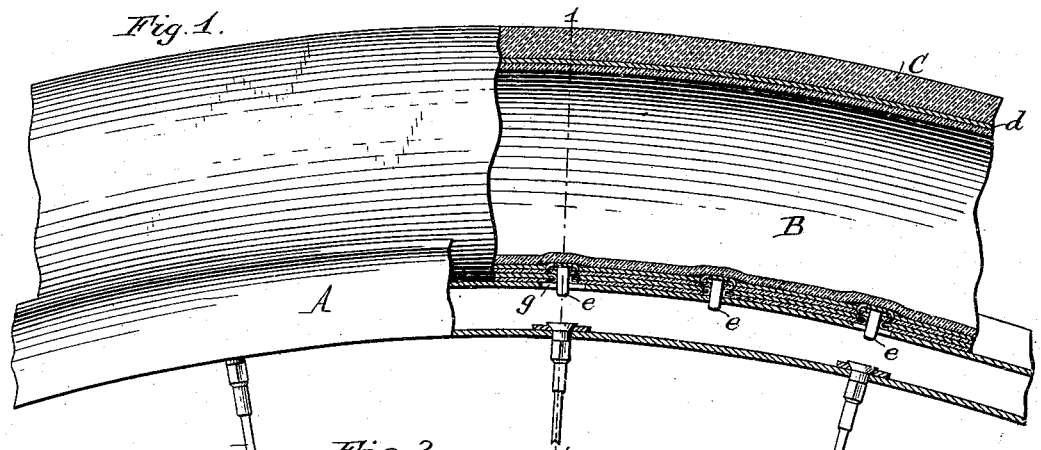
Figure 2:
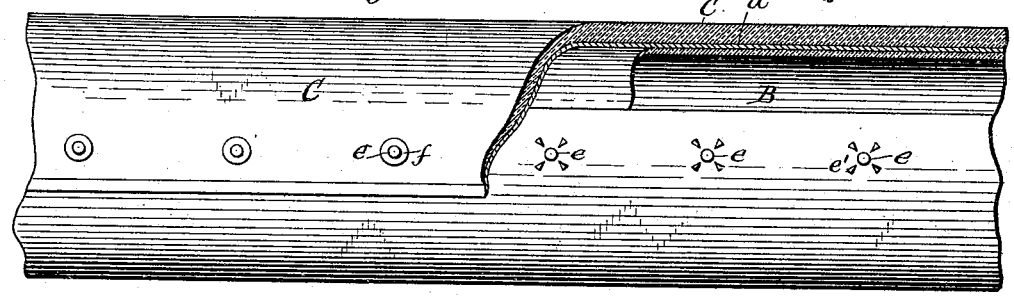
Figure 3:
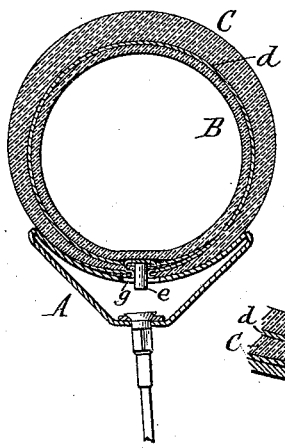
Figure 5:
Figure 4:
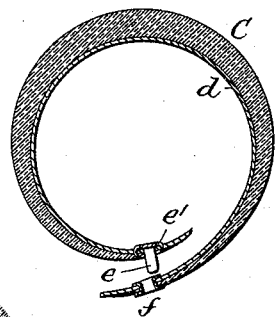
Figure 6:
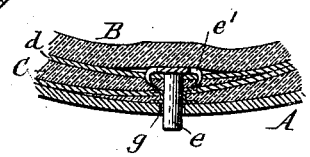

In the accompanying drawings, consisting of two sheets, Figure 1 is a fragmentary sectional elevation of a velocipede-wheel embodying my invention. Fig. 2 is an inner or bottom plan view of the tire, a portion of its envelope being cut away and another portion thereof shown in section. Fig. 3 is a cross-section on line 1 1, Fig. 1. Fig. 4 is a detached cross-section of the envelope with its ends disconnected. Fig. 5 is a top plan view of one of the studs of the envelope, showing the form of its head before being fastened to the envelope. Fig. 6 is an enlarged fragmentary cross-section of the tire, showing the means for connecting the edges of the envelope. Figs. 7, 8, 9, and 10 are cross-sections of modified forms of my invention.

Like letters of reference refer to like parts in the several figures.

A represents the rim of the wheel, which is formed with the usual grooved or concave face. The tire consists, essentially, of two parts—namely, an inner inflatable tube or air-chamber B and an outer covering or envelope C, forming the surface or tread of the tire. This air-tube, which is preferably of the ordinary endless form and constructed of elastic material, has the usual air-inlet for inflating it. This inlet is not shown in the drawings and may be of any common form. The inclosing covering or envelope C is non-elastic, or nearly so, and is preferably constructed of comparatively inelastic rubber or similar material. This envelope is provided with a lining $d$, of canvas or other flexible material, which is preferably formed integrally with the rubber envelope by vulcanization or any other means. The edges of the envelope are arranged adjacent to the rim of the wheel and are overlapped, the lapped portions being tapered or reduced, as shown, to form a flush joint, which fits closely in the concave face of the rim and presents a smooth surface to the air-tube. The inner overlapping edge of the envelope is provided with a longitudinal row of studs or projections $e$, which pass through eyelets or openings $f$, arranged in the contiguous outer edge of the envelope, so as to unite the two edges. The heads of these studs are formed with outwardly-projecting points or spurs $e'$, which, after inserting the studs through openings in the envelope, are bent inwardly through the lining $d$ and the body of the envelope and clinched, as most clearly shown in Figs. 2 and 4. The projecting ends of the studs or projections $e$ enter openings $g$, formed in the face of the rim A, so as to hold the tire against lengthwise displacement on the rim. The studs thus serve not only to prevent separation of the edges of the envelope, but also form stops, which prevent creeping of the tire.

In applying the tire to the rim of the wheel its air-tube is partly inflated and placed into the protecting-envelope, and the edges of the envelope are then united by engaging its studs and eyelets, the studs being at the same time seated in the openings of the rim. The air-tube is then further inflated to the proper extent for use, whereby the surrounding envelope is expanded and tightly drawn into the concave face of the rim. In the event of a leak in the air-tube the tire becomes loosened by the reduction of the air-pressure in the tube, thereby permitting the edges of the envelope to be separated and a patch to be cemented over the leak. As soon as the cement has become set the edges of the envelope are again united and the air-tube is reinflated. The tire can thus be repaired in a convenient manner and in a very short period of time. The edges of the canvas lining $d$, which project beyond the edges of the rubber tread or envelope-body, become slightly frayed in use and present a soft edge or joint which is not liable to wear the contiguous surface of the air-tube.

Figure 7:
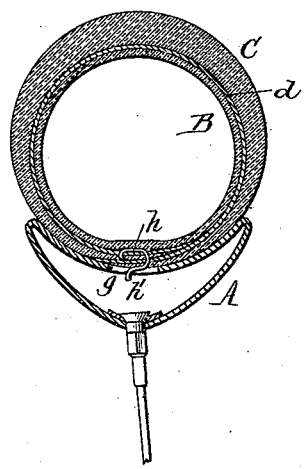

In the modified form of my invention shown in Fig. 7 the lapped edges of the envelope are detachably connected together by sheet-metal hooks or fastenings $h$, which are formed with outwardly-projecting lips $h'$, that enter the openings in the face of the rim and prevent creeping of the tire. The inner portions of these hooks are clinched to the inner edge of the envelope, while their outer portions pass through openings in the outer edge of the envelope and are simply bent, but not clinched, so as to separably connect the two edges of the envelope.

Figure 8:
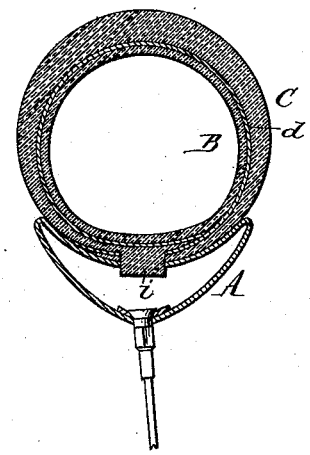

In the modification illustrated in Fig. 8 the stops or projections which prevent displacement of the tire are formed integrally with the envelope, as shown at $i$, and pass through the openings of the rim, as in the previous constructions.

Figure 9:
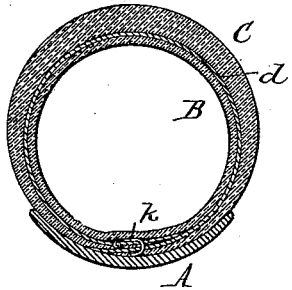
Figure 10:
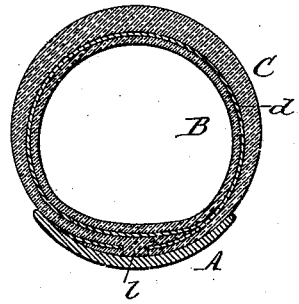

The modified constructions of the invention shown in Figs. 9 and 10 are adapted to wheels having ordinary solid rims. In the construction represented in Fig. 9 the overlapping edges of the envelope are united by sheet-metal hooks $k$, which pass through both edges of the envelope, the inner portion of the hooks being clinched to the inner edge of the envelope, as in the construction shown in Fig. 7, while the outer portion thereof is bent at an angle and rests against the face of the rim. In the construction shown in Fig. 10 the inner edge of the envelope is formed with integral projections $l$, as in the construction shown in Fig. 8. The projections do not, however, extend into holes in the rim, but simply enter openings formed in the outer edge of the envelope and bear against the solid face of the rim. The two modifications last described, while not containing any means for preventing creeping of the tire, form simple constructions for separably uniting the edges of the envelope.

If desired, the usual holes formed in the wheel-rim for the passage of the spoke-nipples may be used for receiving the long studs or stop projections of the tire, as shown in Figs. 1, 2, 3, 7, and 8, in which case no extra openings for the studs need be formed in the rim. When such a construction is used, the long stop projections are arranged at the proper intervals to coincide with the nipple-holes, and the short hooks or studs (shown in Figs. 8 and 10) may be employed on the portions of the tire between the nipple-holes.

The tire is preferably composed of two parts, as herein shown and described; but I do not wish to be confined to such a construction, as in some cases it may be desirable to interpose a strip of tough or hard material between the air-tube and its envelope.

Leather or other flexible material may be substituted for the canvas lining of the envelope; or, if desired, a fibrous material may be compounded with the tread portion of the envelope, in which case no separate lining would be required.

I claim as my invention—

1. A pneumatic tire consisting of an inner inflatable air-tube and a flexible envelope having overlapping edges, one of said edges being provided at intervals with studs or projections and the other with openings which receive said studs or projections, whereby the overlapping edges are united and positively held against longitudinal displacement on each other, substantially as set forth.

2. The combination, with a wheel-rim provided in its face with openings or recesses, of an inflatable tire composed of an inner air-tube and an envelope having its edges separably united by studs or projections which enter the openings of the rim, substantially as set forth.

3. The combination, with a wheel-rim having a concave face provided with openings or recesses, of an inflatable tire composed of an inner air tube or chamber and a surrounding envelope having overlapped edges separably united by studs or projections which enter the openings of the rim, substantially as set forth.

Witness my hand this 11th day of January, 1892.

EMMIT G. LATTA.

Witnesses:
M. W. POTTER,
HENRY F. KLEE.